2,904,586
α-HYDROXY-1,2,5,6-TETRAHYDROBENZYLPHOSPHINOUS ACID AND PREPARATION THEREOF

Heinrich Ruschig, Bad Soden (Taunus), and Walter Aumüller, Frankfurt am Main, Germany, assignors to Farbwerke Hoechst Aktiengesellschaft vormals Meister Lucius & Brüning, Frankfurt am Main, Germany, a corporation of Germany No Drawing. Application May 1, 1956
Serial No. 581,835

Claims priority, application Germany May 9, 1955

3 Claims. (Cl. 260—500)

The present invention relates to the α-hydroxy-1,2,5,6,-tetrahydrobenzylphosphinous acid and the salts thereof with alkali metals and with organic bases of the general formula:

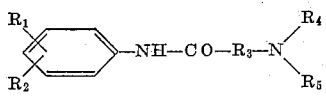

wherein $R_1$ and $R_2$ represent hydrogen atoms, halogen atoms, nitro groups, alkyl or alkoxy groups of low molecular weight, $R_3$ represents an alkylene group of low molecular weight and $R_4$ and $R_5$ represent hydrogen atoms, alkyl, aralkyl, cycloalkyl groups of low molecular weight or together with the nitrogen atom a heterocyclic ring, and a process of preparing these compounds.

It is known from "Beilstein" (4th edition), volume 7, page 232, to heat benzaldehyde with an aqueous solution of hypophosphorous acid to 90° C.–95° C. for 7–8 hours. By precipitating with sugar of lead and decomposing the precipitate with hydrogen sulfide α-hydroxy-benzylphosphinous acid is obtained. The yield is not indicated. When applying this procedure to 1,2,5,6-tetrahydrobenzyl-aldehyde only small quantities of α-hydroxy-1,2,5,6-tetrahydrobenzylphosphinous acid can be isolated. Apparently reaction occurs also at the double bond of the 1,2,5,6-tetrahydrobenzaldehyde, this being substantially avoided according to the present invention. It is known from the U.S. Patent 2,370,903 to prepare the sodium salt of the di-xylyl-α-hydroxy-phosphinous acid by reaction of hypophosphorous acid with isophthalaldehyde. According to the process described there is worked with a molar ratio of 1:1, a temperature of about 55° is observed, and the hypophosphorous acid is used in a concentration of 82%. A time of reaction for the reaction itself is not indicated. If the described steps of the process are applied with a short heating time to the reaction with 1,2,5,6-tetrahydrobenzaldehyde, considerable quantities of bis-(α-hydroxy-1,2,5,6-tetrahydrobenzyl)-phosphinous acid are obtained. With a longer duration of action the reaction on the double bond mentioned already above obviously takes place, so that only small quantities of α-hydroxy-1,2,5,6-tetrahydrobenzylphosphinous acid are obtained.

Now we have found that the new compound, that is the α-hydroxy-1,2,5,6-tetrahydrobenzyl-phosphinous acid and the salts of this acid can be obtained in a technically simple way with higher yields and greater purity by heating 2 to 3 mols of hypophosphorous acid with 1 mol of 1,2,5,6-tetrahydrobenz-aldehyde in a concentration of 40–60% not longer than 2 hours and adding to the reaction mixture a quantity of an organic base of the general formula:

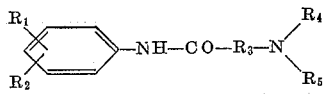

the quantity of this base being preferably at least equivalent to the quantity of the aldehyde used; in said formula $R_1$ and $R_2$ represent hydrogen atoms, halogen atoms, nitro groups, alkyl or alkoxy groups of low molecular weight, $R_3$ represents an alkylene group of low molecular weight, and $R_4$ and $R_5$ represent hydrogen atoms, alkyl, aralkyl, cycloalkyl groups of low molecular weight or together with the nitrogen atom a heterocyclic ring whose hydrohalic acid salts are relatively sparingly soluble in water, the salt obtained is then treated with a dilute alkali liquor in the presence of an organic solvent, not miscible with water.

According to the process of the invention compounds of the indicated formula can especially be used as organic bases, wherein $R_1$ represents an alkyl group of low molecular weight and $R_2$ a chlorine or bromine atom, $R_3$ a methylene group, $R_4$ a hydrogen atom and $R_5$ an alkyl radical of low molecular weight, furthermore benzylamino fatty acid anilides. For example the following compounds are mentioned:

ω-Butylaminoacetic acid-2-methyl-6-chloranilide
ω-Butylaminoacetic acid-2-methyl-3-chloranilide
ω-Benzylaminoacetic acid anilides, and
ω-Benzylaminopropionic acid anilides The reaction is performed according to the process of the invention at an elevated temperature; it is preferable to work at about 70° C. to 90° C. For one mol of 1,2,5,6-tetrahydrobenzaldehyde about 2 to 3 mols, preferably 2.5 to 3 mols of hypophosphorous acid are used in a concentration of about 40–60%, suitably 50%. It was found that only when the indicated conditions of reaction and the quantitative proportions were observed, good yields could be obtained, because under these conditions the formation of by-products, especially of bis-(α-hydroxy-1,2,5,6-tetrahydrobenzyl)-phosphinous acid was largely restrained. Care has to be taken, that the reaction partners react upon each other not longer than 2 hours, preferably about 1 hour.

By the addition of one of the aforementioned organic bases to the reaction mixture, obtained by the reaction of tetrahydrobenzaldehyde with an excess of hypophosphorous acid and suitably diluted with water, in a quantity which is at least equivalent to the quantity of the aldehyde used, a sparingly soluble salt is obtained in a crystalline form which is easy to isolate.

The difficultly soluble salt obtained can be decomposed in a simple way by treating it with an equivalent quantity of alkali liquor in the presence of an organic solvent which is not miscible with water. After the separation of the aqueous phase, for example the sodium salt of the α-hydroxy-1,2,5,6-tetrahydrobenzylphosphinous acid of the following formula can be obtained by concentration.

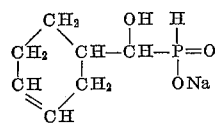

The organic base used can be recovered nearly quantitatively in a simple way.

The α-hydroxy-1,2,5,6-tetrahydrobenzylphosphinous acid obtained according to the process of the invention is, in the form of its sodium salt, a strongly active tonic. The sodium salt is easily soluble in water and owing to its neutral reaction it can be combined without complications with a number of sensible vitamins, hormones and similar substances, for example with ascorbic acid, vitamin $B_1$ and adenosine. In contrast with the α-hydroxy-benzylphosphinate of sodium the compound is distinguished by a considerably lower toxicity.

The following example serves to illustrate the invention, but it is not intended to limit it thereto:

*Example*

(a) In a three-necked flask provided with a strongly efficient stirring device, a thermometer and a reflux condenser, 792 g. of hypophosphorous acid of 50% (6 mols) are heated to 75° C.–80° C. A slow current of carbon dioxide is passed through the device in order to remove the atmospheric oxygen. 220 g. of 1,2,5,6-tetrahydrobenzaldehyde (2 mols) are then caused to flow in, while thoroughly stirring. Care has to be taken that the reaction mixture emulsifies thoroughly. The temperature in the reaction flask rises to about 90° C.; the temperature is allowed slowly to decrease to 80° C. The starting material is kept at this temperature until the reaction is interrupted after 2 hours. About 2 liters of water are added and the mixture is then filtered.

(b) The filtrate is treated with charcoal and, after filtration, it is mixed, while continuously stirring, in small portions, with 508 g. (2 mols) of ω-butylaminoacetic acid-2-methyl-6-chloranilide. First an oily deposit of the salt of ω-butylaminoacetic acid-2-methyl-6-chloranilide of the α-hydroxy-1,2,5,6-tetrahydrobenzylphosphinous acid is obtained which soon, especially after the addition of a few crystals from a previous batch, solidifies in the form of crystals. The crystalline magma is then stirred for some time and allowed to stand overnight, while cooling with ice. By filtering with suction, the salt of ω-butylaminoacetic acid-2-methyl-6-chloranilide of the α-hydroxy-1,2,5,6-tetrahydrobenzylphosphinous acid is obtained in colorless crystals.

The crystals are washed in water. The product obtained can be worked in the moist state (after determination of the water content). After drying 642 g. (74.5% of the theoretical yield, calculated upon the aldehyde used) of the salt of α-hydroxy-1,2,5,6-tetrahydrobenzylphosphinous acid ω-butylaminoacetic acid-2-methyl-6-chloranilide are obtained. The product is analytically pure and melts at 164° C.—165° C.

(c) 430.7 g. of the salt so obtained (1 mol) are shaken with 2 liters of benzene and a solution of 40.4 g. (1.01 mol) of caustic soda in 1.6 liters of water, whereby nearly complete dissolution occurs. After separation, the benzene solution is shaken with a little water and the united aqueous solutions are shaken with a small quantity of ether or ethyl acetate. The aqueous phase, which contains the sodium salt of α-hydroxy-1,2,5,6-tetrahydrobenzylphosphinous acid is treated with a little animal charcoal, if decolorization is desired.

The filtrate is then concentrated under reduced pressure in a nitrogen atmosphere until crystallization sets in and some acetone is added. After filtering with suction and drying in the vacuum dryer 240 g. of the sodium salt of α-hydroxy-1,2,5,6-tetrahydrobenzylphosphinous acid are obtained having the composition $C_7H_{12}O_3PNa \cdot 3H_2O$ (95.16% of the theoretical yield, calculated upon the salt of the ω-butylaminoacetic acid-2-methyl-6-chloranilide of the α-hydroxy-1,2,5,6-tetrahydrobenzylphosphinous acid). The melting point of the anhydrous substance is at about 236° C. (with decomposition).

The total yield, calculated upon 1,2,5,6-tetrahydrobenzaldehyde, amounts to 70.88% of the theoretical yield.

By acidifying the aqueous solution of the sodium salt of α-hydroxy-1,2,5,6-tetrahydrobenzylphosphinous acid and by subsequently extracting this solution with ethyl acetate, there is obtained, after distilling off the solvent, α-hydroxy-1,2,5,6-tetrahydrobenzylphosphinous acid.

By combining a solution of 1/10 mol of the sodium salt of α-hydroxy-1,2,5,6-tetrahydrobenzyl-phosphinous acid in 50 ccm. of water with a solution of the equivalent quantity of $CaCl_2 \cdot 6H_2O$ in 50 ccm. of water a white, crystalline precipitate of the calcium salt of α-hydroxy-1,2,5,6-tetrahydrobenzyl-phosphinous acid is formed, which is filtered off with suction after it was allowed to stand for a prolonged time at room temperature, the precipitate is first washed with water and then with acetone and finally dried on the steam bath. The compound sinters from 230° C. and forms no limpid melt. The analytical data found correspond to the theoretically calculated data. 1 g. of the calcium salt of α-hydroxy-1,2,5,6-tetrahydrobenzyl-phosphinous acid is soluble in 27 ccm. of water.

Just as the salt of the ω-butylaminoacetic acid-2-methylchloranilide of the 1,2,5,6-tetrahydrobenzylphosphinous acid the following salts of the α-hydroxy-1,2,5,6-tetrahydrobenzylphosphinous acid are, among others, appropriate for the separation of this acid from the excess of hypophosphorous acid according to the Example 1b and a.

The salts of:

ω-Butylaminoacetic acid-2-methyl-3-chloranilide, melting point 156° C.–157° C.

ω-Butylaminoacetic acid-4-methyl-3-bromanilide, melting point 166° C.–167° C.

ω-Butylaminoacetic acid-2-methyl-3-bromanilide, melting point 156° C.–157° C.

ω-Butylaminoacetic acid-2,6-dichloranilide, melting point 173° C.–175° C.

ω-Butylaminoacetic acid-2,6-dibromo-4-methylanilide, melting point 154° C.–156° C.

ω-Butylaminoacetic acid-2,6-dimethylanilide, melting point 167° C.–168° C.

ω-Butylaminoacetic acid-2-methyl-5-methoxyanilide, melting point 128° C.–130° C.

ω-Butylaminoacetic acid-2-methylanilide, melting point 157° C.–158° C.

ω-Benzylaminoacetic acid anilide, melting point 172° C.–173° C.

ω-Benzylaminopropionic acid anilide, melting point 148° C.–150° C.

We claim:

1. Compounds selected from the group consisting of α-hydroxy-1,2,5,6-tetrahydrobenzylphosphinous acid and the alkali metal salts thereof.

2. The sodium salt of α-hydroxy-1,2,5,6-tetrahydrobenzylphosphinous acid.

3. In the process of preparing compounds selected from the group consisting of α-hydroxy-1,2,5,6-tetrahydrobenzylphosphinous acid, the alkali metal salts, and the salts of α-hydroxy-1,2,5,6-tetrahydrobenzylphosphinous acid with bases of the general formula

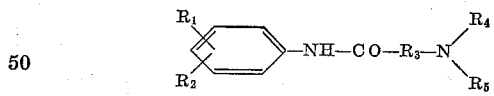

wherein $R_1$ and $R_2$ are members selected from the group consisting of hydrogen, chlorine, bromine, alkyl and alkoxy groups having at most 4 carbon atoms, $R_3$ represents an alkylene group having at most 4 carbon atoms and $R_4$ and $R_5$ are members selected from the group consisting of hydrogen, alkyl and aralkyl groups, the alkyl groups of which having at most 4 carbon atoms by heating for at most 2 hours 2 to 3 mols of hypophosphorous acid in a concentration of 40 to 60% with 1 mol of 1,2,5,6-tetrahydrobenzaldehyde, the step of adding to the reaction mixture a quantity, at least equivalent to the quantity of the aldehyde used, of an organic base of the general formula given above and treating the salt thus obtained with an equivalent of a dilute alkaline liquor in the presence of an organic solvent which is not miscible with water.

References Cited in the file of this patent

FOREIGN PATENTS 453,437   Great Britain _____ Sept. 7, 1936

OTHER REFERENCES

Schmidt: Berichte 81, 477–483 (1948).